United States Patent [19]
Link et al.

[11] Patent Number: 5,270,937
[45] Date of Patent: Dec. 14, 1993

[54] VEHICLE MAP POSITION DETERMINING APPARATUS

[75] Inventors: Laura J. Link, Hanover Park; Mary F. Spencer, Kildeer, both of Ill.

[73] Assignee: Motorola, Inc., Schaumburg, Ill.

[21] Appl. No.: 691,872

[22] Filed: Apr. 26, 1991

[51] Int. Cl.⁵ .............................................. G06F 15/50
[52] U.S. Cl. .................... 364/449; 364/460; 340/995
[58] Field of Search ............... 364/450, 444, 460, 447, 364/436; 340/990–993, 995; 73/178 R

[56] References Cited

U.S. PATENT DOCUMENTS

| | | | |
|---|---|---|---|
| 4,511,973 | 4/1985 | Miura et al. | 364/449 |
| 4,570,227 | 2/1986 | Tachi et al. | 364/444 |
| 4,635,202 | 1/1987 | Tsuji et al. | 364/449 |
| 4,796,189 | 1/1989 | Nakayama et al. | 364/449 |
| 4,796,191 | 1/1989 | Honey et al. | 364/449 |
| 4,903,211 | 2/1990 | Ando | 364/443 |
| 4,926,336 | 5/1990 | Yamada | 364/444 |
| 4,999,783 | 3/1991 | Tenmoku et al. | 364/449 |

OTHER PUBLICATIONS

Robert French, "Map Matching Origin, Approaches and Applications", Second Symposium on Land Vehicle Navigation, Munster, Germany, Jul. 1989 pp. 211–234.
Newman and Sproul, "Principles of Interactive Computer Graphics," 2nd Ed., 1979, pp. 65–67.
Nicholl et al, "An Efficient New Algorithm for 2D Line Clipping: Its Development and Analysis", Computer Graphics, vol. 21, No. 4 Jul. 1987, pp. 253–262.
Robert French, "Automobile Navigation Technology: Where is it Going?" May 25, 1988.
Kaijian et al., "An Efficient Line Clipping Algorithm", Computer and Graphics, vol. 14, No. 2, pp. 297–301, 1990.

*Primary Examiner*—Thomas G. Black
*Assistant Examiner*—Michael Zanelli
*Attorney, Agent, or Firm*—Phillip H. Melamed; John H. Moore

[57] ABSTRACT

A vehicle navigation/position system (10) investigates road segments having start and end coordinates stored in a road map data memory (13). The system determines what road segments have at least a portion inside a rectangle of interest (ROI-100) about an estimated vehicle position (101). Map matching then corrects vehicle position by locating vehicle position on one of the road segments inside the rectangle of interest. Vehicle location/navigation information is then provided. A computer (11) identifies road segments as inside the rectangle of interest (100) by creating electrical signals associated with each road segment start/end coordinate as compared to boundary coordinates of the rectangle. These electrical signals identify the road segment coordinates with respect to areas (B-I) surrounding the rectangle of interest (A). For road segments extending between opposite middle side areas (B-I, C-G), the computer (11) determines the road segment inside the rectangle of interest, and the road segment is added to a list.

24 Claims, 5 Drawing Sheets

| AREAS FOR ROAD SEGMENT START TO END LOCATIONS | NUMBER OF POSSIBLE ROAD SEGMENTS | POSITIVELY INSIDE RECTANGLE OF INTEREST | |
|---|---|---|---|
| A→A; A→B; A→C<br>A→D; A→E; A→F<br>A→G; A→H; A→I | 9 | YES | |
| B→E; C→G | 2 | YES | 11 |
| I→G; I→H; G→H | 3 | NO | |
| I→I; G→G; H→H | 3 | NO | |
| F→C; F→D; C→D | 3 | NO | |
| F→F; C→C; D→D | 3 | NO | |
| I→E; I→F; E→F | 3 | NO | |
| E→E | 1 | NO | |
| H→B; H→D; B→D | 3 | NO | |
| B→B | 1 | NO | 20 |
| I→B; I→D; I→C | 3 | MAYBE | |
| F→G; F→H; F→B | 3 | MAYBE | |
| H→E; H→C | 2 | MAYBE | |
| D→G; D→E | 2 | MAYBE | |
| E→G; E→C | 2 | MAYBE | |
| C→B | 1 | MAYBE | |
| B→G | 1 | MAYBE | 14 |

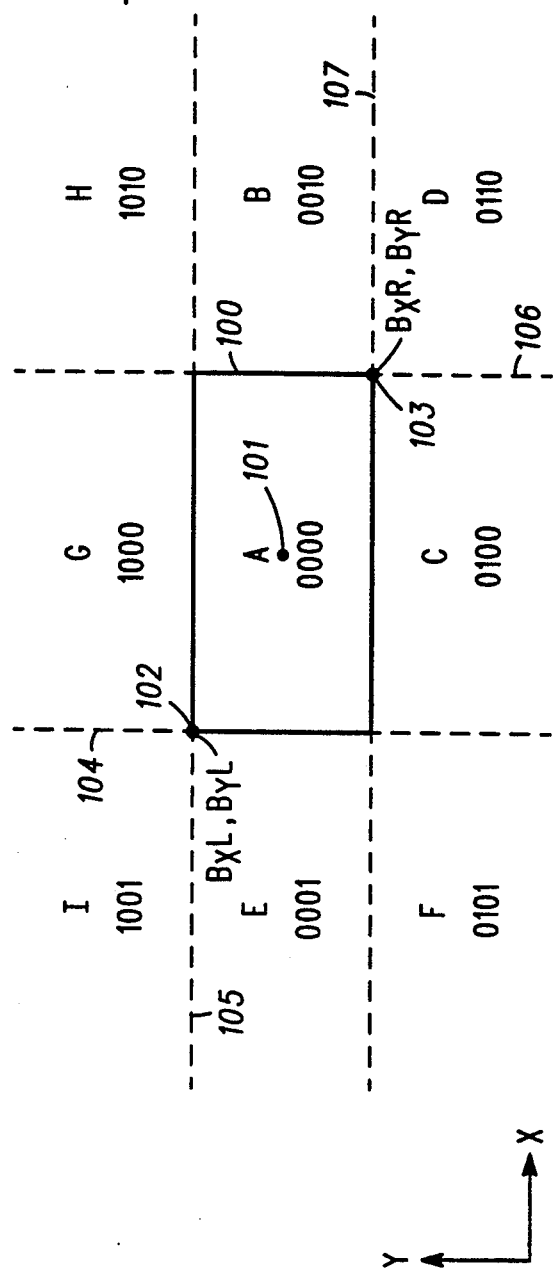

VEHICLE MAP POSITION DETERMINING APPARATUS

FIELD OF THE INVENTION

The present invention is related to the field of determining vehicle position with respect to roadway map coordinates.

BACKGROUND OF THE INVENTION

In many prior vehicle location and vehicle navigation systems, an estimated position of a vehicle is first determined and then compared with positions of fixed roadways which are defined by road map data stored in a memory. A position/navigation computer then first determines what roadways are close to the estimated position of the vehicle. Then the computer corrects the position of the vehicle by map matching techniques in which the vehicle position is located on the most probable one of the roadways previously identified as being close to the estimated position of the vehicle. Many prior systems utilize such map matching techniques wherein the history of prior vehicle travel, as well as the current estimated position of the vehicle, its prior sensed heading and its current sensed heading are used to accomplish map matching. Since it is assumed that the vehicle is on a fixed roadway and since accurate coordinates of fixed roadways are stored in a memory, a more accurate corrected position of the vehicle is achieved. Then the prior systems utilize this corrected vehicle position information as the current vehicle position and information is provided to the vehicle driver.

Based on the corrected position, the prior systems either calculate desired navigation routes to a desired destination and provide route information to a user, or they provide updated position information to a user and/or to a navigation computer which provides user navigation information based on the current corrected position. Typically, information is provided to the user by means of a visual display, which may or may not be supplemented by audible signals. This information could include navigation turning instructions for following a planned route.

A first step in providing for map matching is the identification of what stored road segments are close to the initial estimated position of the vehicle. This simplifies the map matching techniques because it limits the number of road segments which will be investigated as possible locations for the vehicle. Typically the road segments are stored in memory by virtue of their start and end Cartesian coordinates. One prior system apparently identified which road segments were close to the estimated vehicle position by defining an area (subregion) around the estimated position. Then this prior system created a list of road segments which had at least a portion inside the subregion. The prior system apparently solved simultaneous equations which define the road segment and the boundaries of the area around the estimated vehicle position. If a solution existed, then the road segment was known to intersect the area boundaries and the road segment was identified as close. A computer can relatively quickly solve such equations to therefore determine if a road segment is close to the estimated vehicle position. However, when a very large number of road segments must be investigated, this process becomes very time consuming.

In the field of computer graphics line clipping, the problem of displaying only the portions of line segments which are inside a "window" is solved. This problem is generally solved by the use of coordinate comparison signals which are then analyzed to eliminate some line segments from consideration before resorting to equation solving. However, the standard computer graphics line clipping techniques, even if they were applied to the present problem, still require equation solving for a large number of possible road segments. Thus, there is a need for an improved apparatus which more efficiently determines which road segments are close to an initial estimated vehicle position.

SUMMARY OF THE INVENTION

A vehicle map position determining apparatus is described herein. The apparatus includes a map memory means which stores map data defining fixed road segments that exist in an overall geographical area. Boundary data is provided which defines boundaries for a geographical subregion of the geographical area and a determination is made, by accessing the map data and the boundary data, as to which road segments have at least a portion inside the geographical subregion. Then some utilization apparatus utilizes the data which defines which road segments have been identified as having a portion inside the geographical subregion so as to provide vehicle navigation/position information to a user. In such an apparatus as described above, the map data is received as data which defines start and end coordinates of the fixed road segments and the boundary data is received as data which defines, as the boundary data, the boundary coordinates of the subregion. A comparison apparatus compares the start and end coordinates of the road segments with the boundary coordinates and provides, as a result thereof, a set of electrical signals associated with each road segment. These electrical signals define the start and end coordinates as being either inside the subregion or in any one of four corner areas adjacent the subregion or in any one of four middle side areas between two of the corner areas and adjacent the region. A logic means then receives these electrical signals and determines, in accordance therewith, which of said road segments have a portion inside the subregion by noting that a road segment has a portion inside if the electrical signals indicate the start and end coordinates are each in different opposite middle side areas adjacent the subregion.

Preferably, the subregion is defined as a rectangle of interest and is defined by boundary data consisting of the opposite corner coordinates of the rectangle. Also, the set of electrical signals may form a four digit binary signal created by comparing any of the start and end coordinates of a road segment with the boundary coordinates of the subregion wherein the electrical signals are indicative of the positive and negative signs which result from such comparisons. In this manner, just based on these comparisons and the resultant electrical signals, the apparatus described herein can positively identify when a road segment is inside or outside of the rectangle of interest in 31 out of 45 possible situations. For the remaining 14 situations, the more time consuming technique of simultaneously solving road segment and boundary equations can be utilized to obtain final results. However, the present apparatus does not require the use of solving equations for 31 out of 45 possible positions of the road segment end coordinates with respect to the rectangular subregion of interest. Thus, a much more efficient determination of road segments which have at least a portion inside a rectangle of interest is achieved. The present apparatus is even more efficient than just the application of the conventional logic signal comparison technique used in computer graphics line clipping if that technique were applied to the present situation.

BRIEF DESCRIPTION OF THE DRAWINGS

For a more complete understanding of the present invention, reference should be made to the drawings in which:

FIG. 5 is a graphical representation of possible vehicle position and road segment coordinate position locations;

FIG. 6 is a chart which illustrates results of road segment and boundary comparisons implemented by the flowchart in FIG. 4;

DESCRIPTION OF THE PREFERRED EMBODIMENTS

Figure 1:
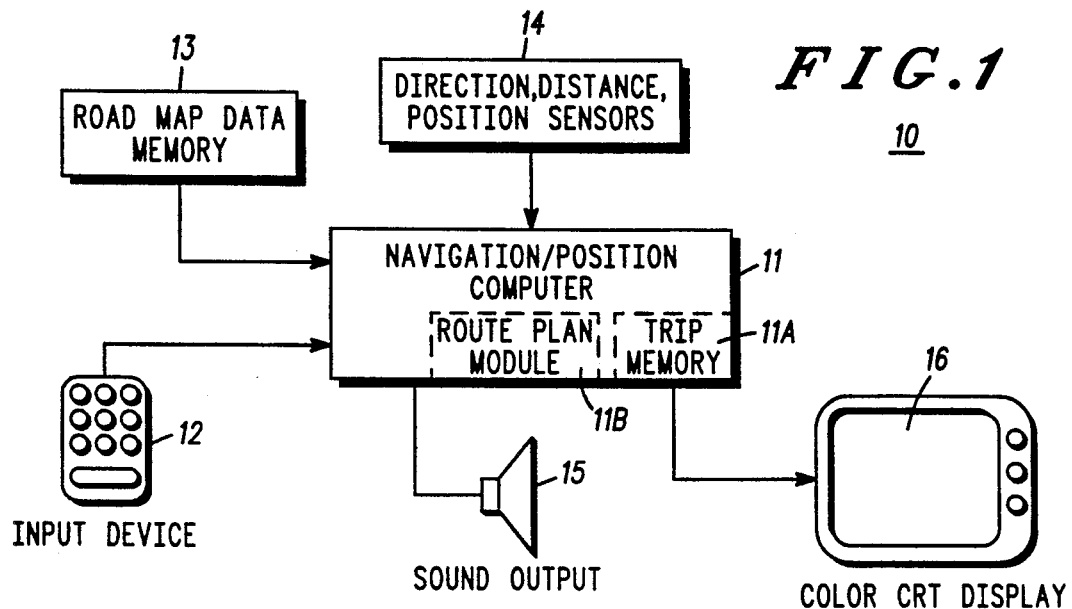
FIG. 1 is a schematic diagram of a vehicle navigation/position system.

Referring to FIG. 1, a vehicle navigation/position system 10 is illustrated which is installed in a vehicle (not shown). The system includes a navigation/position computer 11 which includes therein a memory location 11A in which data for calculating a trip is stored wherein the data in this memory comprises a desired destination and driver preferences specifying, among other things, general driver specified characteristics of road segments which should be used to form a route to the destination. Also, the navigation/position computer 11 includes a route plan module 11B therein which represents programming of the computer so as to calculate a desired route to a destination given the location of the destination and the vehicle driver preferences to be used in calculating such a route.

The system 10 includes direction, distance and position sensors 14 which provide information with regard to vehicle movement and estimated vehicle position to the navigation/position computer 11. In addition, a vehicle driver or user of the system 10 can direct the system 10 to implement various functions or enter data, such as destination data, via an input device 12. The device 12 may be a keyboard, as shown in FIG. 1, or it could comprise an audible transducer which, in response to audible sounds, provides electrical signals to a speech recognition apparatus that provides electrical signals to the navigation/position computer 11. The computer 11 provides audible outputs to the system user via a speaker 15 and provides visual outputs to the user via a CRT display device 16. Road map data to be used by the computer 11 is stored in a road map data memory 13 in which fixed road segments in an overall geographical area are defined therein by defining the start and end Cartesian coordinates of such road segments.

In the system 10, the sensors 14, which may include a global positioning receiver, provide estimated vehicle position information to the computer 11 as to the estimated coordinates of the vehicle in which the system 10 is installed. The memory 13 provides the location of all road segments on which the vehicle may actually be located. The computer 11 then provides a map matching function which basically corrects the probable vehicle position by locating the vehicle on one of the road segments defined by the data in the memory 13. This is achieved, as is the case in prior systems, by identifying the road segments which are adjacent (close) to the initial estimated vehicle position and by studying the current estimated position, the prior travel history of the vehicle, and the current and prior heading directions of the vehicle. With all this information, the computer 11 then estimates the probable correct position of the vehicle on one of the accurately defined road segments defined by the data in memory 13. Once a corrected position of the vehicle is achieved, then the computer 11 can either display the corrected position to the vehicle driver via the CRT display 16, or, if desired, the computer 11 can then calculate a route to a desired destination specified by the vehicle driver via the input device 12. If the vehicle is already on a planned route to a destination, the corrected vehicle position is used by the computer 11 to provide the next navigation maneuver instruction to the driver.

Figure 2:
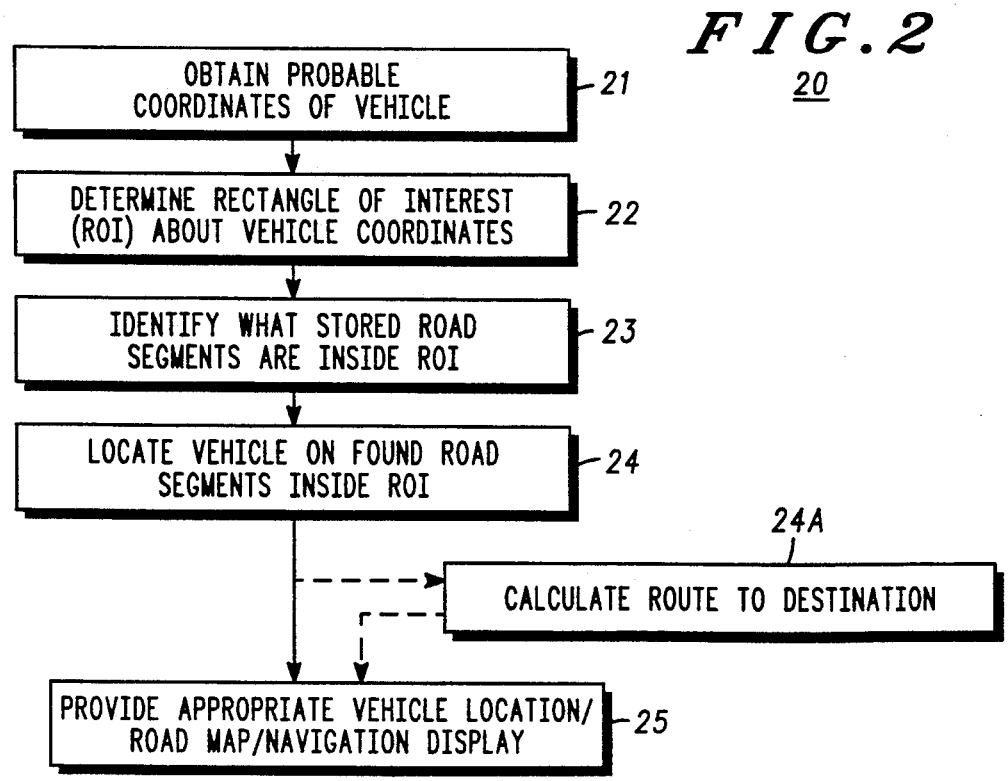
FIG. 2 is a flowchart illustrating general operation of the system in FIG. 1.

FIG. 2 illustrates a flowchart 20 which indicates how the computer 11 can be programmed so as to generally operate as described above. At an initial step 21, the computer obtains the probable estimated coordinates of the vehicle from data supplied by the sensors 14. The step 21 can include the computer analyzing such data and processing it as a dead reckoning position system, or it can merely receive global positioning signals supplied to it by a global positioning receiver which is part of the sensors 14. A step 22 then represents the computer 11 determining an area or rectangle of interest (ROI) about the estimated vehicle coordinates. The rectangle of interest is a subregion of an overall geographical area, and the road segments stored in memory 13 define all of the roads in this overall area. A step 23 then identifies which of the road segments identified by the data in memory 13 are located inside this rectangle of interest. It should be noted that the terminology "inside" is utilized herein to designate any road segment which has at least a portion thereof which either enters the rectangle of interest or intersects the boundaries of such a rectangle of interest. After the step 23, a step 24 locates, by map matching, the vehicle on one of the identified road segments which was determined to have a portion inside the rectangle of interest.

As indicated above, the step 24 has been implemented in all prior map matching navigation systems and is accomplished by studying the prior travel history of the vehicle, its current estimated position, its current and prior heading direction and various other data. The specifics with regard to implementing step 24 are not part of the present invention and therefore such specifics will not be discussed since many prior systems implement such a step. A next step in the flowchart 20 is step 25 which indicates that an appropriate vehicle location/road map/navigation display is then provided to the user. This is implemented by the display 16 responding to the computer 11 which preferably provides thereon a display of appropriate road segments with an indication of vehicle location superimposed thereon. Many prior vehicle position/navigation systems, implement such a step and therefore the details of implementing such a step are not discussed herein.

Figures 3, 7:
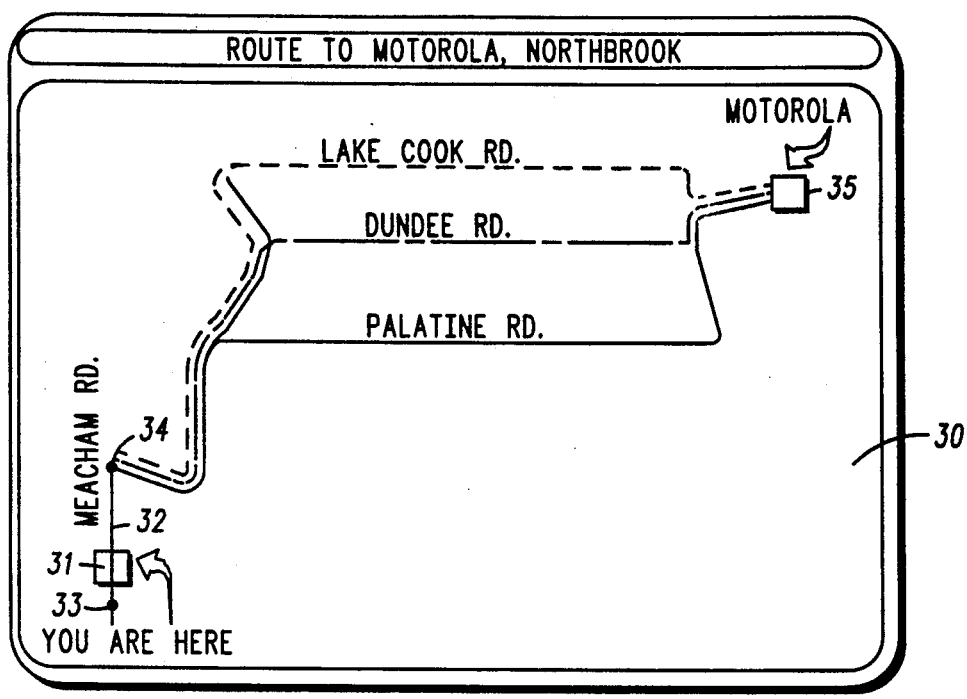
FIG. 3 is a graphical illustration of a typical visual display provided by the system in FIG. 1.
FIG. 7 is a chart which illustrates how the comparison data in FIG. 6 can be analyzed by logic circuitry to determine if portions of road segments are positioned inside a geographical subregion.

FIG. 3 illustrates a typical display provided on the CRT 16 by the step 25. This display indicates the current vehicle position 31 located on a road segment 32 having defined start and end coordinates 33 and 34, respectively. The display 30 also indicates the existence of several other road segments and a final destination 35. Some of the road segments shown in FIG. 3 may be highlighted or displayed in some other distinctive manner to indicate that they represent a preferred route from the vehicle's current position at 31 to its final desired destination position at location 35. It should be noted that display 30 is merely a typical display which could be provided by the step 25.

Prior to the step 25, the computer 11 may implement a step 24A which calculates a route to a desired destination specified by the vehicle driver via the input device 12. This calculation requires a determination of correct current vehicle position and this is achieved by the step 24. The route would be calculated by the route plan module 11B in the computer 11 which represents sophisticated route planning programming of the computer 11. Again, the details of the route calculation implemented by step 24A are not substantially pertinent to the present invention and therefore will not be discussed.

The present system 10 provides an improved implementation of the step 23 which identifies what stored road segments defined in the data in memory 13, have a portion inside a geographical subregion about the initial estimated coordinates of the vehicle. The determination of these road segments is necessary as a precursor condition for implementing the step 24. The details of implementing the step 23 in FIG. 2 are indicated by a flowchart 40 shown in FIG. 4.

Figure 4:
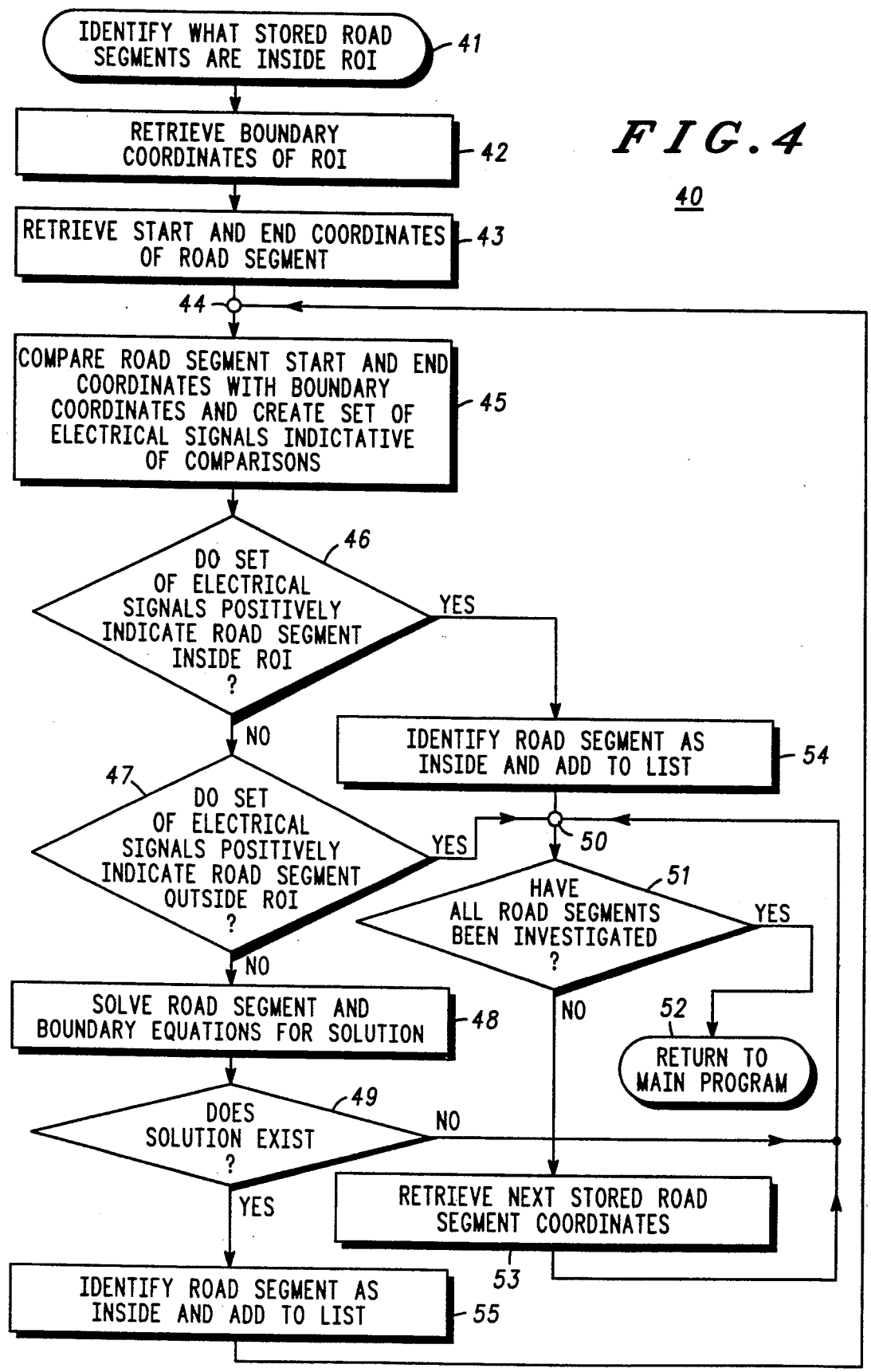
FIG. 4 is a flowchart illustrating in more detail one of the flowchart steps shown in FIG. 2.

Referring to FIG. 4, the flowchart 40 starts at an entry step 41 which identifies this flowchart as a flowchart identifying what stored road segments are inside a rectangle of interest. This "rectangle of interest" is an area which surrounds the estimated coordinates of vehicle position as sensed by the sensors 14 and/or as initially calculated by the computer 11. Referring to FIG. 5, a typical rectangle of interest (ROI) 100 (which includes its boundary lines) is illustrated surrounding a location 101 which corresponds to the coordinates of the estimated vehicle position. Such a rectangle is created by the computer 11 receiving data as to the location of the estimated vehicle position 101 and then creating the rectangle by spacing boundaries at some arbitrary distances from this position, such as 100 meters, in both x and y directions wherein the coordinates of the position 101 are expressed in Cartesian coordinates. This results in the creation of the rectangle of interest 100 shown in FIG. 5. Since the geometry of such a rectangle is known, the boundaries of this rectangle can be completely defined by specifying the Cartesian coordinates of opposite corners of the rectangle corresponding to points 102 and 103 shown in FIG. 5. The area inside the rectangle of interest 100 shown in FIG. 5 is designated as area A and various areas surrounding and outside the rectangle of interest are shown in FIG. 5 as corresponding to areas B thru I. The x and y coordinates of point 102 are defined by lines 104 and 105, respectively, and the x and y coordinates of point 103 are defined by lines 106 and 107, respectively.

Basically, the computer 11 will compare the start and end coordinates of each road segment in memory 13 with respect to the coordinates of the boundary points 102 and 103. It will then create a set of electrical signals, which may be binary logic signals, as a result of such comparisons wherein these signals locate the road segment coordinates in the areas A-I. An analysis of these electrical signals is then implemented by conventional combinational logic circuitry or logical combination operations are implemented by the computer 11 so as to positively conclude, in 31 out of 45 possible situations, if a road segment has a portion inside the rectangle 100 and therefore inside the area A. For the 14 out of 45 situations which cannot be positively verified just by analysis of these electrical signals, then equations will be set up by the computer and solved to determine if a road segment equation intersects the boundaries of the rectangle of interest 100. The above operations are achieved by the steps indicated in flowchart 40 which will now be discussed in detail. However, it should be noted that while a rectangle of interest 100 is shown as the subregion utilized, other graphical configurations for a subregion could be utilized if desired.

Referring again to FIG. 4, after entry of the flowchart 40 at the step 41, a step 42 retrieves the boundary coordinates of a rectangle of interest corresponding to the rectangle 100 shown in FIG. 5. The retrieved boundary coordinates correspond to the coordinates of the opposite corner points 102 and 103 shown in FIG. 5. The computer 11 created the rectangle 100 by receiving the estimated vehicle position 101 and preferably stepping the xy coordinates of the point 101 by both positive and negative increments so as to define the rectangle 100. After the step 42, a step 43 retrieves both the start and end coordinates of a first one of the stored road segments stored in the map memory 13. Then control passes to a terminal 44 and from there to a step 45 in which the road segment start and end coordinates are compared with the boundary coordinates of the rectangle of interest. This will create a set of electrical signals which may be logic signals that are indicative of the positive/negative signs of such comparisons. These logic signals form a four digit binary signal associated with each road segment start and end coordinate, wherein the four digit signal locates the coordinate in one of the areas A-I. The step 45 is best illustrated by reference to FIG. 6 which is a chart that indicates the results of comparing the Cartesian xy coordinates of a road segment coordinate $R_x$, $R_y$, with the opposite corner Cartesian coordinates of the points 102 and 103. In FIGS. 5 and 6 the x, y coordinates of the point 102 are represented by the notation $B_xL$, $B_yL$, while the x, y coordinates of the point 103 are represented by $B_xR$, $B_yR$.

In order to understand the results of these comparisons, simultaneous reference to both FIGS. 5 and 6 should be made and the polarity of the xy axes as indicated in FIG. 5 should be considered.

Essentially, any road segment coordinate $R_x, R_y$ has to lie within one of the areas A-I. The flowchart 40 takes each of the start and end coordinates of a road segment and compares each of those coordinates with the boundary coordinates corresponding to the points 102 and 103 to determine which of the areas A-I a road segment coordinate lies in. FIG. 6 represents a chart of all such possible combinations that can result from the comparison of any road segment coordinate with the boundary points 102 and 103. For location inside the area A, (which includes the boundary lines of subregion 100), the y coordinate of a road segment point $R_x$, $R_y$ must be equal to or less than the y coordinate of the upper left corner boundary point 102 and equal to or greater than the y coordinate of point 103. Also, the x coordinate $R_x$ must be equal to or less than the x coordinate of point 103 and equal to or greater than the x coordinate of point 102. This is indicated in FIG. 6 by the column of comparison results shown in the column designated as A wherein these comparison results will indicate that the road segment point is inside the area A. The results of comparisons which indicate the location of points as being in the other areas B-I shown in FIG. 5 are also shown in FIG. 6. FIG. 6 also indicates a number of comparison results which cannot physically occur and therefore are representative of invalid (INV) comparison results.

While FIG. 6 indicates the results of these comparisons in terms of greater than or less than or equal to results, clearly these comparisons are indicative of the signs of comparisons between the coordinates of a road segment point R and each of the boundary points 102 and 103. Also, by consistently substituting logical 1's and 0's for such comparison results, as shown in FIG. 6, it is apparent that FIG. 6 illustrates a chart that defines a four digit binary signal which identifies each of the areas A-I. While the four digit binary signal is shown in top to bottom column form in FIG. 6, it is shown in FIG. 5 in left to right row form. Road segment coordinate to boundary point coordinate comparisons create the logic signals that form the four digit binary signals and positively identify the location of a road segment coordinate with regard to what geographical area A-I it must be present in. The flowchart 40 will utilize just the four digit logic signals created by these comparisons to determine positively, in 31 out of 45 possible positions of a road segment, whether or not this road segment has a portion inside the rectangle of interest 100. This is achieved by the remaining portions of the flowchart 40.

While the above paragraphs illustrate how the road segment and boundary coordinate comparisons can be used to create a set of electrical logic signals indicative of each of the areas A-I, the same results can be achieved just by analyzing the signs (the sign bits) of the electrical numerical difference signals which result from the desired comparisons. Thus, creation of a four digit binary signal may not be required since an analysis of the signs of the electrical difference signals that result from the desired comparisons can provide the same information without creating an additional four digit binary signal. However, conceptually it is easier to describe the present apparatus in terms of creating a four digit binary signal.

Referring to FIG. 4, as was previously indicated the step 45 essentially results in implementing a number of comparisons for both the start and end coordinates of a road segment with each of the boundary coordinate points 102 and 103. The end result is a set of four logic signals associated with each start and end coordinate of a road segment. The logic signals associated with each road segment coordinate define which of the areas A-I the road segment coordinate lies in. The table in FIG. 6 generally illustrates how these comparisons define what area a road segment coordinate $R_x$, $R_y$ will lie in.

After the step 45, the flowchart proceeds to a decision step 46 which inquires if the resultant logic signals for each start and end coordinate of a road segment positively indicate that the road segment being investigated has at least a portion inside the rectangle of interest. If not, control passes to a decision block 47 which analyzes the same logic signals to determine if they indicate, positively, that the investigated road segment is outside of the rectangle of interest 100. If the answer to this question is negative, then control passes to a step 48 which represents the computer 11 establishing equations which define the boundaries of the rectangle of interest 100 and/or the straight line segment between the start and end coordinates of a road segment and solving these equations to determine if a solution exists. Thus, the step 48 represents a much more time consuming step which is only implemented, in the flowchart 40, if an analysis of the logic signals corresponding to the information indicated in FIG. 6 cannot provide a positive indication as to whether or not the road segment has a portion inside the rectangle of interest.

After the step 48, a decision block 49 determines if a solution exists with regard to solving the equations set up by the step 48. If no solution exists, then the road segment is outside the rectangle of interest and control passes to a terminal 50. If the decision block 47 can positively conclude, just by looking at the logic signals produced in response to comparing the road segment start and end coordinates to the boundary coordinates, that the road segment is outside the rectangle of interest, control also passes from step 47 to the terminal 50. From the terminal 50, control proceeds to a decision block 51 which inquires if all stored road segments have been investigated. If the answer is yes, then control passes to a step 52 which results in resuming the main flowchart 20 shown in FIG. 2. Thus, the next step would be passing control from the step 52 to the map matching step 24 shown in FIG. 2. If not all of the road segments have already been investigated, then control passes from decision block 51 to a step 53 which retrieves the start and end coordinates of the next road segment that is to be investigated. Then control passes back to the terminal 44 and the step 45 is reexecuted with regard to these newly retrieved road segment coordinates.

Essentially, the steps 51-53 represent incrementing a search of all of the road segments stored in the memory 13 until all of them have been investigated as to whether or not they are inside the rectangle of interest. Such an incrementation of road segment coordinates can be readily accomplished in a number of ways such as stepping through a known sequence of memory locations in the memory 13. The specifics of this sequencing is not significant.

If the decision block 46 identifies, just based on the logic signals produced by the step 45, that the road segment is positively inside the rectangle of interest 100, then control passes from step 46 to a step 54 which identifies this road segment as one of the road segments having at least a portion inside the rectangle of interest. This road segment is then added to a list of all road segments having a portion inside the rectangle of interest wherein the map matching step 24 in flowchart 20 will utilize only such identified road segments in this list when determining where to correctly position the vehicle with respect to the road segments. From step 54 control then passes to the terminal 50 and then on to the step 51. Similarly, if decision block 49 identifies that a solution exists for the equations set up by the step 48, then control passes to a step 55 which also identifies the road segment as having a portion inside the rectangle of interest and adds it to the same list, and then control again passes to the terminal 50 and then on to the step 51.

Basically, the decision block steps 46 and 47 inquire if it is possible to positively determine, just by comparison of road segment start and end coordinates with the boundaries of the area (rectangle) of interest, if a road segment is inside or outside of the rectangle of interest. The steps 46 and 47 essentially represent combinational logic steps implemented by the computer 11 based upon the set of logic signals produced by the step 45 for each start and end coordinate of a road segment that is compared with the opposite corner coordinates 102 and 103 of the rectangle of interest. The table in FIG. 7 assists in analyzing this type of logic operation by listing all of the possible road segment configurations which may exist and whether the resultant logic signals which result from coordinate comparisons can positively determine if such a road segment positively has at least a portion inside the rectangle of interest.

Figure 8:
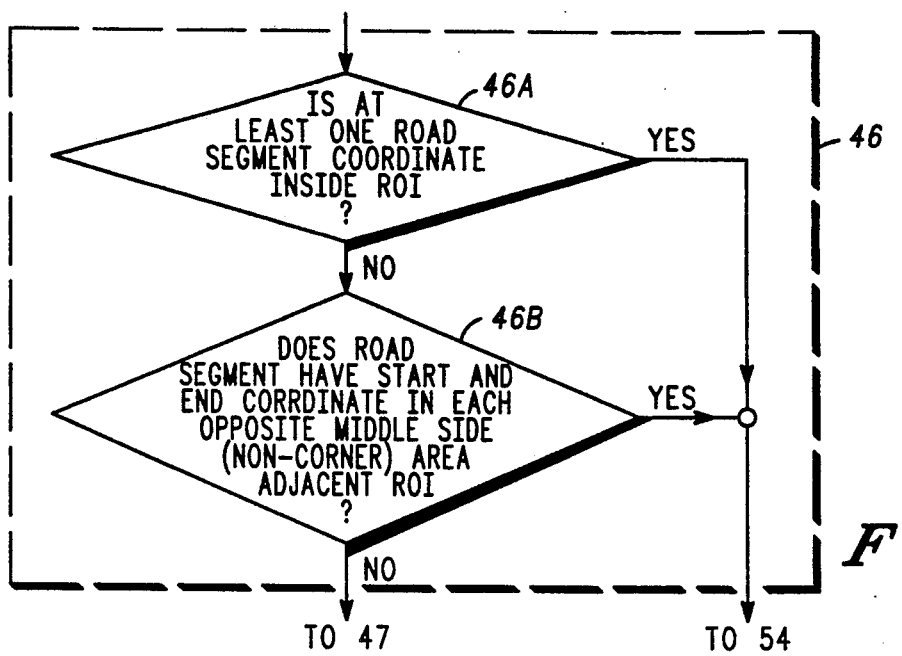
FIG. 8 is a flowchart detailing one of the flowchart steps in FIG. 4.
Figure 9:
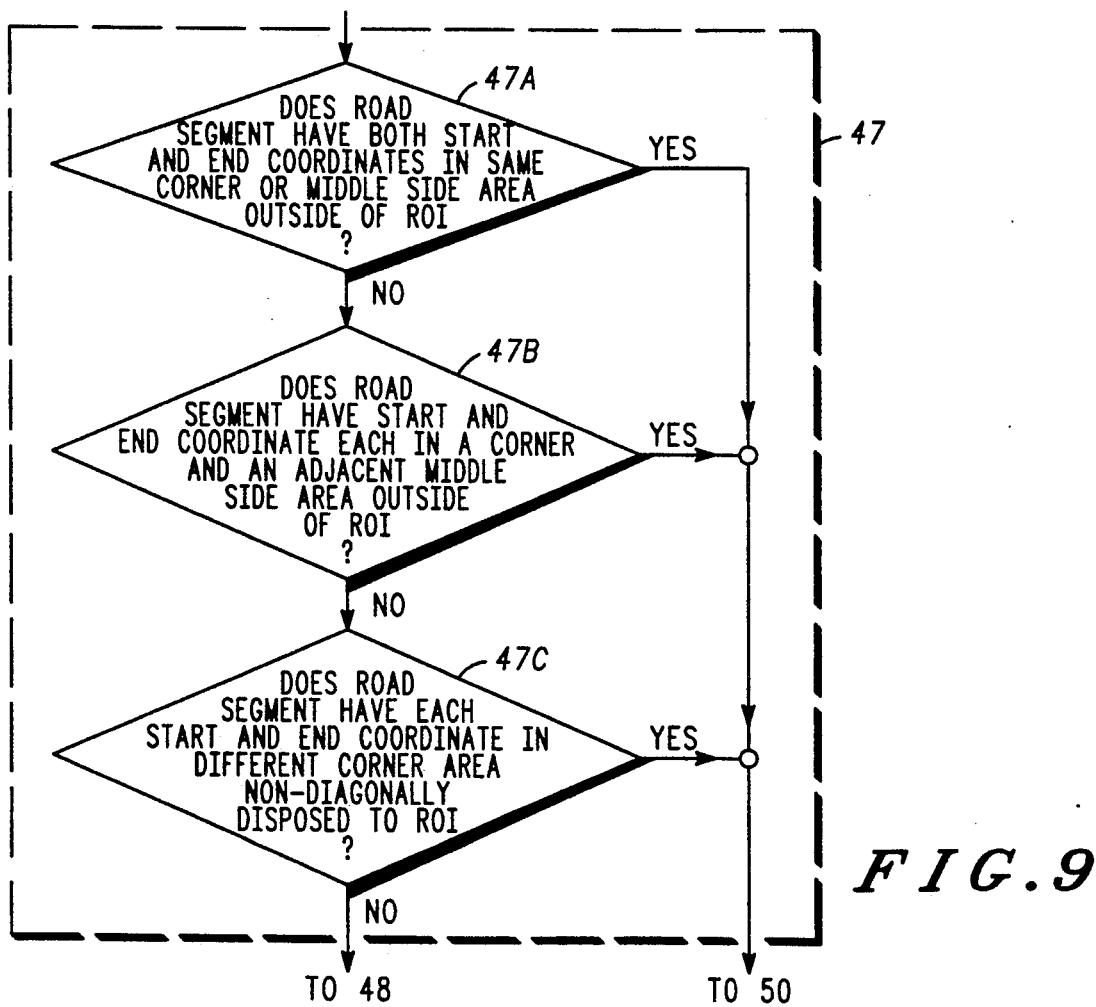
FIG. 9 is a flowchart detailing another one of the flowchart steps in FIG. 4.

The table in FIG. 7 is a compilation of the results of the flowcharts in FIGS. 8 and 9 which detail the steps 46 and 47 in FIG. 4. Basically, the initial part of the table in FIG. 7 indicates that there are nine possible road segments, ignoring start to end polarity, in which one or more of the start or end coordinates of a road segment is already inside the geographical area A and therefore the road segment has a portion inside the rectangle of interest 100. Of course, if a road segment start or end coordinate is inside the rectangle of interest, the road segment must be inside the rectangle of interest. The table in FIG. 7 indicates that there are nine possible road segments which either start and/or end in the area A. For any of these road segments the logic signals produced by the step 45 will indicate that one of the road segment start or end coordinates is inside the area A. If so, at least one of the two sets of four logic signals for the start or end coordinates will positively identify a road segment as having a portion inside the rectangle of interest. It should be noted that in the table in FIG. 7, polarity or direction of the road segment is ignored since it does not matter with regard to the conclusions being made.

The table in FIG. 7 also indicates that if the road segment is identified as extending from area B to E, or vice-versa, or from area C to G, or vice-versa, the road segment must of necessity pass through the area A. FIG. 7 therefore indicates that there are a total of 11 possible road segment positions which can positively be identified, just by the four logic signals which are created by comparing each start and end coordinate of these road segments with the boundary corner locations 102 and 103, as being inside (having at least a portion within or intersecting with) the area A.

What has been discussed above corresponds to step 46 which, in FIG. 8, comprises steps 46A and 46B. Step 6A asks if any road segment coordinate is inside the rectangle 100. This is determined by looking at the four digit binary signal that locates each road segment coordinate with respect to the areas A-I. Step 46B then asks if the sets of logic signals indicate that the road segment extends between two opposite middle side (non-corner) areas adjacent the rectangle 100. If so, again the line segment must have at least a portion inside the rectangle 100. This logic signal analysis has not been previously implemented, even in prior known computer graphics line clipping techniques. The step 46B saves resorting to equation solving for more situations than would have been suggested by use of standard line clipping techniques. Thus step 46B therefore increases the efficiency of the present system.

In analyzing the logic signals which identify various areas, it should be noted that the regions B,E,C and G represent four middle side areas adjacent the center rectangle of interest 100, and that areas D, F, I and H represent four corner areas adjacent the rectangle 100. Also, each middle side area is located between and adjacent to two corner areas. With these definitions, it can be seen how step 46B can determine a road segment as having a portion inside rectangle 100 if it extends between opposite middle side areas.

FIG. 7 also illustrates that there are 20 different road segments defined by their start and end locations which will give rise to logic signals that can conclusively show that these road segments are not within the rectangle of interest 100. Thus, for example, a road segment which begins in the area I and ends in the area G cannot possibly intersect the rectangle of interest 100. Similarly, a road segment which begins in the area E and ends in the area F, also cannot possibly intersect the rectangle of interest 100. The details of step 47, as shown by the flowchart steps 47A, 47B, and 47C in FIG. 9, illustrate how these 20 situations arise.

Referring to FIG. 9, step 47A asks if the road segment has start and end coordinates which lie in the same corner or middle side area (one of the areas B-I) outside the rectangle of interest 100. If so, since straight line road segments are assumed, the road segment is outside the rectangle 100. Step 47B asks if the logic signals indicate that the road segment extends between a corner area and an adjacent middle side area, e.g., I to G or I to E. If so, again the road segment is positively outside the rectangle 100. Step 47C asks if the road segment extends between different corner areas which are nondiagonally disposed with respect to the rectangle 100, such as I to H or I to F. If so, again the road segment is positively outside the rectangle 100.

Basically, the step 45 in FIG. 4 creates the logic signals associated with a road segment by comparing the start and end coordinates of a road segment with the opposite corner coordinates of a rectangle of interest. The steps 46 and 47 then analyze the results of these comparisons wherein each set of comparisons for one road segment coordinate results in four logic signals which form a four digit binary signal. Based on an analysis of the two four digit binary signals which relate to the start and end coordinates of a road segment, the steps 46 and 47 conclude if it is possible to positively identify the road segment as having a portion inside or as being outside the rectangle of interest 100. For a total of 31 possible locations of a road segment, out of a total of 45 possible road segment locations, this will result in positively determining if the road segment is inside or outside the rectangle of interest. For some road segments, such as a road segment that begins in the area I and ends in the area B, the logic signal analysis is inconclusive and therefore a more complex and time consuming solution of equations is necessary to make a positive determination. FIG. 7 identifies such road segments as "maybe" and indicates that there are 14 of such road segment locations.

Basically, the vehicle map position determining apparatus described herein creates a set of logic signals by comparing road segment start and end locations with boundary coordinates of a subregion. Based on these comparisons, an effective set of logic signals is created and these logic signals are utilized in determining if a road segment is inside or outside the subregion. If the results of analyzing these logic signals is inconclusive, then equations are solved to positively verify if a road segment intersects or enters into the subregion. However, before this time consuming solution of equations is reached, an analysis of logic signals is first implemented wherein these logic signals are created by simple comparisons of coordinates of road segment beginning and end points and coordinates which define the subregion. This achieves a much more rapid determination of whether or not a road segment is inside a desired subregion since the creation of the logic signals by comparison and their analysis is a much faster process than the solution of several equations. Since in practical vehicle position/navigation systems there are an extremely large number of road segments stored in memory, saving even a small amount of time on each road segment to be investigated is desirable. The present system will avoid requiring solution of equations for 31 out of a possible 45 general positions of road segments with respect to a rectangle of interest or desired subregion A. The results of identification of which road segments are within an area of interest are then utilized by additional subroutines of the computer 11 to provide position/navigation information to a system user.

While the flowchart 40 in FIG. 4 illustrates the step 46 preceding the step 47, it may be more efficient, in some cases, to have the step 47 precede the step 46. This depends upon the size of the rectangle of interest 100 with regard to the overall geographical area for which all of the stored road segments in the memory 13 are defined for. In other words, if there is a very small rectangle of interest but a very large overall geographical area for which road segments are stored in the memory 13, then most road segments will probably not be within the rectangle of interest In such a case, it will be more efficient to have the step 47 precede the step 46 because most of the logic signals that are produced will positively indicate that the road segment is not within the rectangle of interest. On the other hand, if the rectangle of interest is relatively large with regard to the overall geographical area for all of the road segments stored in the memory 13, then most segments will be within the rectangle of interest and step 46 should precede the step 47. In either case, both of these steps will precede the more time consuming equation step 48 and thereby save calculation time for the system 10.

While I have shown and described specific embodiments of this invention, further modifications and improvements will occur to those skilled in the art. All such modifications which retain the basic underlying principles disclosed and claimed herein are within the scope of this invention.

What is claimed is;

1. Vehicle map position determining apparatus comprising:
map memory means for storing map data defining fixed road segments which exist in an overall geographical area;
determining means coupled to said map memory means for accessing said map data and determining which of said road segments have at least a portion inside a subregion of said geographical area, said subregion generally defining a quadrilateral;
means for receiving vehicle position data; and
utilization means coupled to said receiving means and said determining means for utilizing said vehicle position data and said map data in said map memory means which defines said road segments determined as having at least a portion inside said subregion to provide vehicle navigation/position information to a vehicle user,
wherein said determining means includes,
means for receiving, as said map data, data defining start and end coordinates of each of said road segments;
means for defining said subregion in terms of boundary coordinates;
means, coupled to said receiving means and said defining means, for comparing said start and end road segment coordinates with said boundary coordinates and providing, as a result of said comparison, a set of electrical signals defining the location of each of said start and end coordinates with respect to said subregion, said set of electrical signals defining the location of said start and end road segment coordinates as being inside said subregion or in any one of four corner areas adjacent said subregion or in any one of four middle side areas each between two of said corner areas and adjacent said subregion; and
logic means for identifying any of said road segments as having at least a portion inside said subregion in response to said set of electrical signals indicating each one of said road segment start and end coordinates being in different ones of said middle side areas on opposite sides of said subregion.

2. Vehicle map position determining apparatus according to claim 1 wherein said logic means also identifies said road segment as having at least a portion inside said subregion in response to said set of electrical signals indicating any one of said start and end coordinates being inside said subregion.

3. Vehicle map position determining apparatus according to claim 2, wherein said logic means includes means for identifying said road segment as being outside said subregion in response to said set of electrical signals indicating said start and end road segment coordinates are each located in one of said corner areas and in a middle side area adjacent said one corner area.

4. Vehicle map position determining apparatus according to claim 3 wherein said logic means includes means for identifying said road segment as outside said subregion in response to said set of electrical signals indicating each of said start and end road segment coordinates being in different ones of said four corner areas which are nondiagonally disposed with respect to said subregion.

5. Vehicle map position determining apparatus according to claim 4 wherein said logic means includes means for identifying said road segments as outside said subregion in response to said set of electrical signals indicating that both of said start and end road segment coordinates are in the same one of said four corner or four middle side areas.

6. Vehicle map position determining apparatus according to claim 2 wherein said utilization means includes means for making a list of all of said road segments identified by said logic means as having at least a portion inside said subregion.

7. Vehicle map position determining apparatus according to claim 1 wherein said utilization means includes means for making a list of all of said road segments identified by said logic means as having at least a portion inside said subregion.

8. Vehicle map position determining apparatus according to claim 1 wherein said set of electrical signals form a four digit binary digital signal, said subregion, said four corner areas and said four middle side areas each corresponding to a different specific four digit value for said digital signal.

9. Vehicle map navigation apparatus according to claim 1 wherein said logic means includes means for positively determining if said road segment has at least a portion inside said subregion for 31 of a total possible 45 different possible locations of said road segment start and end coordinates in said subregion, said four corner areas and said four middle side areas by analysis of said set of electrical signals for each of said start and end coordinates.

10. Vehicle map position determining apparatus according to claim 1 wherein said determining means also includes means for solving equations which define said road segment and at least some of said subregion boundaries to determine if there is an intersection.

11. Vehicle map position determining apparatus according to claim 10 wherein said determining means includes means for identifying said road segments as being within said subregions if an intersection solution for said equations exists.

12. Vehicle map position determining apparatus according to claim 1 wherein said road segments have different start and end coordinates.

13. Vehicle map position determining apparatus according to claim 12 wherein said start and end coordinates of said road segments are expressed in terms of Cartesian coordinates.

14. Vehicle map position determining apparatus according to claim 13 wherein said boundary coordinates of said subregion comprise coordinates which define, in Cartesian coordinates, opposite corners of a rectangular area which forms said subregion.

15. Vehicle map position determining apparatus according to claim 14 wherein said road segments comprise straight line segments which exists between said start and end coordinates.

16. Vehicle map position determining apparatus according to claim 1 wherein said boundary coordinates of said subregion comprise coordinates which define, in Cartesian coordinates, opposite corners of a rectangular area which forms said subregion.

17. Vehicle map position determining apparatus according to claim 16 wherein said start and end coordinates are compared with said opposite corner boundary coordinates to create said set of electrical signals.

18. Vehicle map position determining apparatus according to claim 17 wherein four logic signals, which are part of said set of electrical signals, are created and stored in response to each comparison of each of said start and end coordinates with each of said opposite corner coordinates, and wherein for any particular set of said four logic signals which indicate at least one of said start and end coordinates is within said rectangular area, said corresponding road segment between said start and end coordinates is determined to have at least a portion inside said rectangular area.

19. Vehicle map position determining apparatus according to claim 1 wherein said set of electrical signals provided by said comparison means comprise difference signals which result from said comparison, and wherein said logic means analyzes the signs of said difference signals in order to determine if any of said road segments have at least a portion inside said subregion.

20. Vehicle map position determining apparatus according to claim 19 wherein said logic means also identifies said road segment as having at least a portion inside said subregion in response to said set of electrical signals indicating any one of said start and end coordinates being inside said subregion.

21. Vehicle map position determining apparatus according to claim 20 wherein said logic means includes means for identifying said road segment as outside said subregion in response to said set of electrical signals indicating each of said start and end road segment coordinates being in different ones of said four corner areas which are nondiagonally disposed with respect to said subregion.

22. Vehicle map position determining apparatus comprising:
   means for providing coordinates for an estimated vehicle position;
   map memory means for storing map data defining fixed road segments which exists in an overall geographical area;
   determining means coupled to said map memory means for accessing said map data and determining which of said road segments have at least a portion inside a subregion of said geographical area about said estimated vehicle position, said subregion generally defining a quadrilateral;
   map matching means coupled to said determining means for utilizing said map data in said map memory means which defines said road segments determined as having at least a portion inside said subregion and said estimated vehicle position to provide a corrected vehicle position; and
   means to provide vehicle navigation/position information to a vehicle user based on the corrected vehicle position;
   wherein said determining means includes,
   means for receiving, as said map data, data defining start and end coordinates of each of said road segments;
   means for defining said subregion in terms of boundary coordinates;
   means, coupled to said receiving means and said defining means, for comparing said start and end road segment coordinates with said boundary coordinates and providing, as a result of said comparison, a set of electrical signals defining the location of each of said start and end coordinates with respect to said subregion,
   said set of electrical signals defining the location of said start and end road segment coordinates as being inside said subregion or in any one of four corner areas adjacent said subregion or in any one of four middle side areas each between two of said corner areas and adjacent said subregion, and
   logic means for identifying any of said road segments as having at least a portion inside said subregion in response to said set of electrical signals indicating each one of said road segment start and end coordinates being in different ones of said middle side areas on opposite sides of said subregion.

23. Vehicle map position determining apparatus according to claim 22, wherein said logic means includes means for identifying said road segment as being outside said subregion in response to said set of electrical signals indicating said start and end road segment coordinates are each located in one of said corner areas and in a middle side area adjacent said one corner area.

24. Vehicle map position determining apparatus according to claim 22 wherein said set of electrical signals provided by said comparison means comprise difference signals which result from said comparison, and wherein said logic means analyzes the signs of said difference signals in order to determine if any of said road segments have at least a portion inside said subregion.

* * * * *